Patented Apr. 24, 1923.

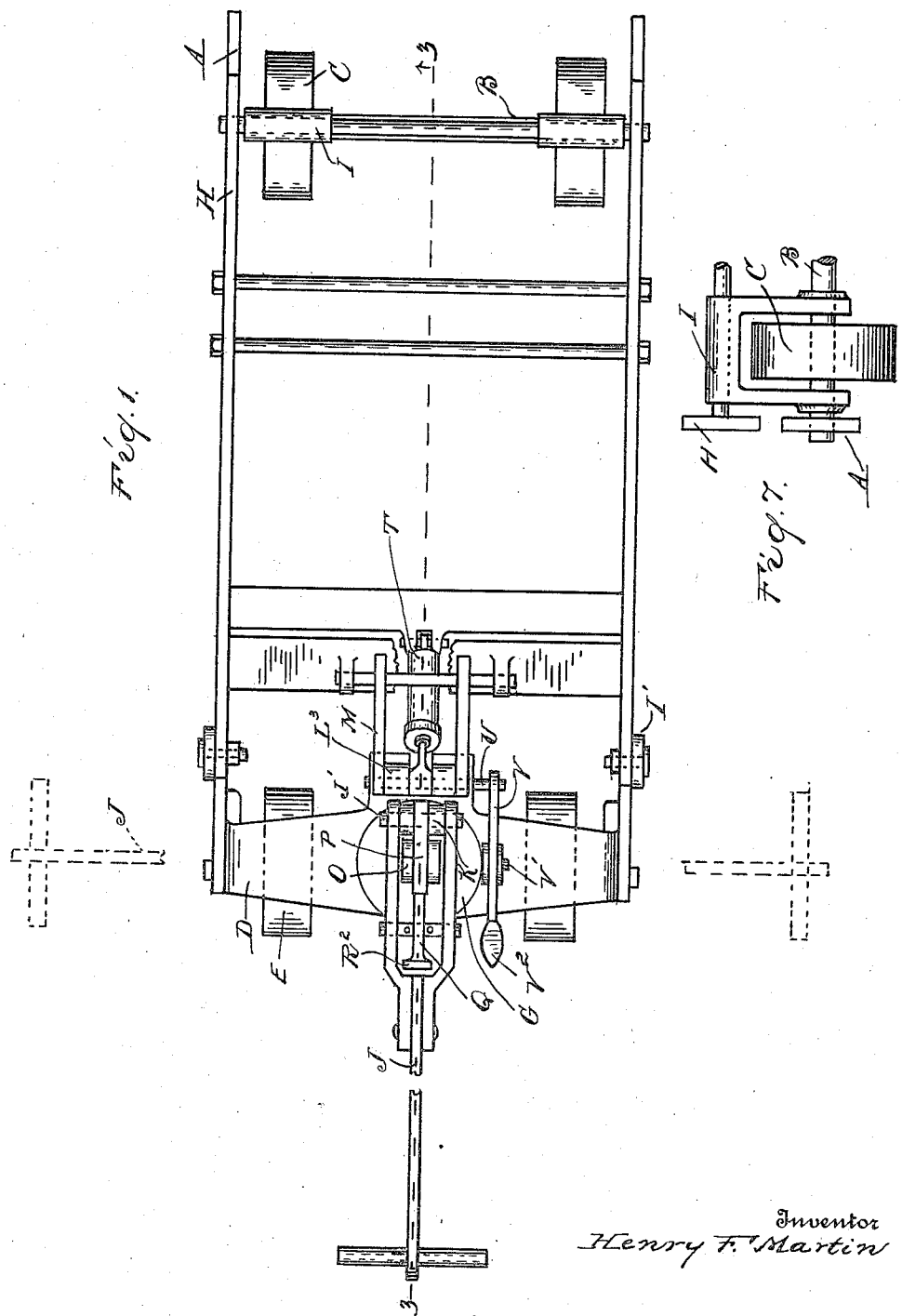

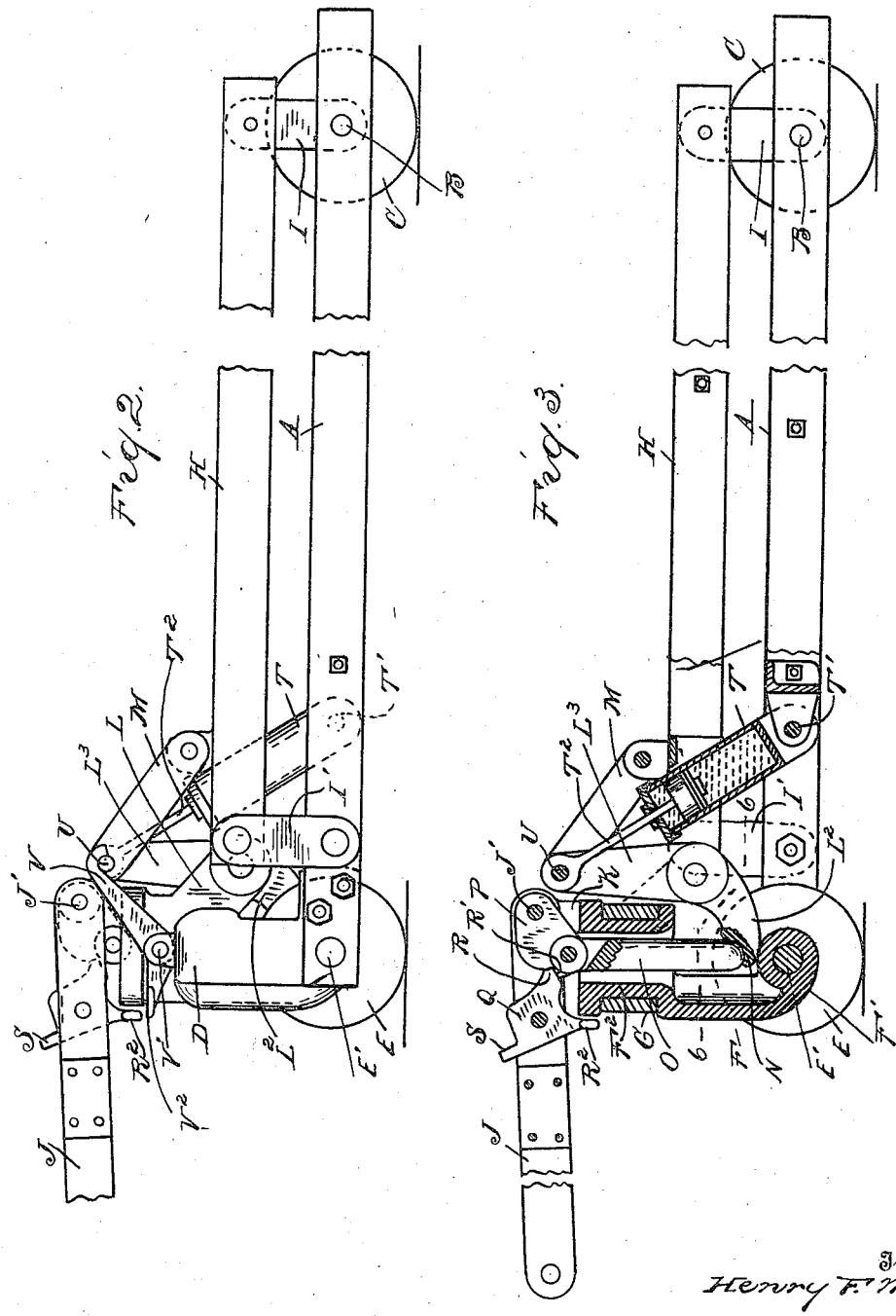

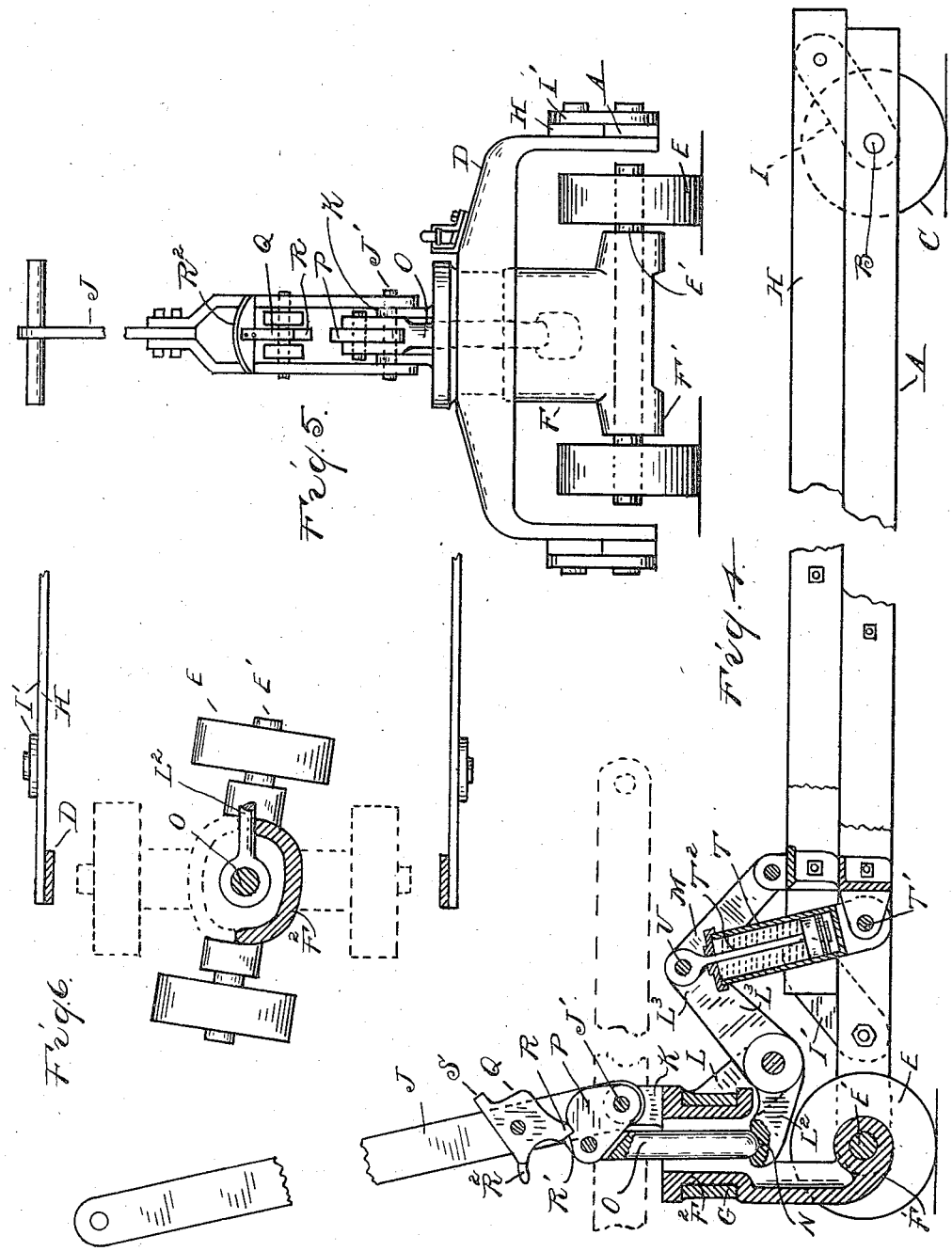

1,452,566

UNITED STATES PATENT OFFICE.

HENRY F. MARTIN, OF DETROIT, MICHIGAN, ASSIGNOR TO DETROIT HOIST AND MACHINE COMPANY, OF DETROIT, MICHIGAN, A CORPORATION OF MICHIGAN.

LIFTING TRUCK.

Application filed October 14, 1921. Serial No. 507,619.

*To all whom it may concern:*

Be it known that I, HENRY F. MARTIN, a citizen of the United States of America, residing at Detroit, in the county of Wayne and State of Michigan, have invented certain new and useful Improvements in Lifting Trucks, of which the following is a specification, reference being had therein to the accompanying drawings.

This invention relates to lifting trucks and relates more particularly to hand trucks having a loading frame or platform vertically adjustable with relation to the main frame of the truck and adapted to be moved to an elevated position by swinging of the handle.

The invention consists in the structural features and arrangement of parts hereinafter described and illustrated in the accompanying drawings wherein:—

Figure 1 is a plan view of the improved truck.

Figure 2 is a view of the same in side elevation.

Figure 3 is a longitudinal sectional view taken on line 3—3 of Figure 1 and showing a raised position of the loading frame.

Figure 4 is a similar sectional view showing the loading frame lowered.

Figure 5 is a front view of the truck.

Figure 6 is a cross section on line 6—6 of Figure 3, showing one of the limiting positions of the steering wheels and the limiting means.

Figure 7 is a fragmentary rear elevation of the truck.

In these views the reference character A designates the side bars of the main frame of the truck and B is the rear axle connecting and spacing the rear ends of said bars and providing a mounting for the rear wheels C. D is a yoke member forming a portion of the main frame establishing a rigid connection between the forward ends of the bars A. Said member is arched as is best seen in Figure 5 to accommodate beneath the same the front or steering wheels E mounted upon the axle E'. Said axle is journaled in a bearing F' integrally formed upon the lower end of an upright member F, the tubular upper end $F^2$ of which is swiveled in a vertical bearing G formed centrally integrally with the yoke member D. H designates the side bars of a loading frame which bars extend above the bars A and seat upon the latter in the lowered position of said loading frame. The loading frame is mounted upon the main frame by means of a rear pair of links I engaging the axle B and a forward pair of links I' engaging respectively the front end portions of the bars A. Thus through swinging of said links the loading frame is adjustable from the lowered position shown in Figure 5 to the raised position shown in Figures 2 and 3. J is a handle member pivoted at J' upon a lug K integrally rising from the swivel member $F^2$. Said handle forms a means for pulling or pushing the truck and for steering the same and further serves to actuate the loading frame to its elevated position. Thus upon a lug L, projecting integrally rearwardly from the bearing F, there is pivoted at L' a bell crank $L^2$, $L^3$, the arm $L^3$ being connected by links M with the front end of the loading frame while the arm $L^2$ projects forwardly and is terminally recessed beneath the tubular journal portion $F^2$ of the member F. O is a thrust bar vertically arranged within the tubular journal member $F^2$ and having a rounded lower end seating in the recess N of the arm $L^2$. Upon the pin J' there is pivoted one end of a link P pivotally connected at its other end to the upper extremity of the thrust bar O. Upon the handle J adjacent the link P there is pivoted a dog Q having a tooth R projecting downwardly and engageable with a shoulder R' of said link to establish an actuating connection between the handle and said link. A treadle $R^2$ projects forwardly from the dog Q to permit said dog to be pedally engaged with the link P and a rearwardly projecting pedal S upon the said dog adapts the same to be disengaged from said link. Said pedals are proportioned to substantially counterbalance each other. T is a dash pot of any suitable construction, having its lower end pivoted at T' to the main frame of the machine, the plunger rod $T^2$ of said dash pot being pivoted at its upper end upon the pin U connecting the bell crank with the links M. The yielding resistance offered by said dash pot to downward movement of the pin U insures a gradual descent of the loading frame when released. For maintaining the raised position of said frame there is employed a dog V pivoted intermediately at V' upon the bearing G, the rear end of said dog being hooked for engagement with the pin U, and its forward end having the nature of a treadle V² for releasing said dog from said pin.

Considering now the operation of the described construction it will be understood that the loading frame when in lowered position such as is shown in Figure 4 rests upon the bars A of the main frame, the links I and I', being rearwardly inclined. To raise the loading frame, the handle J is first elevated as indicated in Figure 4 and the forward end of the dog is depressed to engage the tooth R with the shoulder R' of the link P. The handle J is now swung down to the substantially horizontal forwardly projection shown in dash lines in Figure 4, the link P being swung in unison with said handle owing to its engagement by the dog Q. Said link forces the thrust bar O downwardly and since the latter seats upon the bell crank arm L², the bell crank is rocked to the position shown in Figure 3 elevating the pin U and pulling the lifting frame to raised position through the links P. As the platform arrives at a maximum elevation, the pin U rides under the dog V, the hooked end of which drops over said pin to hold the loading frame in raised position independently of the handle. The operator may now release the dog Q from the link P (by depressing the rear treadle S) and may lower the handle to the position most convenient for pulling or pushing the truck.

It is to be observed that once the dog V is engaged with the pin U, the handle J may be swung either up or down or laterally without effecting the position of the loading frame and without any interference from the mechanism connecting the handle to said frame for actuating the latter. The freedom of lateral movement of the handle is secured by the free engagement of the thrust bar O with the bell crank arm L², said thrust bar merely swiveling upon the engaged arm when the handle is laterally shifted. The construction is such as to permit free lateral movement of the handle either in a raised or lowered position thereof or in any intermediate position. The limiting positions of lateral movement of the handle are indicated in Figure 1 in dash line, these positions being established by engagement of the member F with the bell crank arm L² as is best seen in Figure 6.

In Figure 4 there is shown in dash lines a rearwardly projecting horizontal position of the handle J which may be assumed by swinging said handle down around its pivot pin J'. Said position is advantageous primarily as a stored position for the handle when the truck is not in use. When it is desired to lower the loading frame it is necessary only to pedally release the dog V from the pin U, whereupon the frame H will gradually descend under weight of the load (or its own weight), an abrupt dropping of said frame being prevented by the dash pot T. It is to be observed that in the raised position of the loading frame, the bell crank arm L² engages the front axle bearing F', the latter forming a stop limiting swinging of the bell crank and consequently preventing undue stressing of the dash pot or actuation of the loading frame H forwardly beyond normal raised position.

What I claim as my invention is:

1. A lifting truck comprising a wheeled frame having a steering wheel, a loading frame adjustable vertically upon said wheeled frame, a mounting for said steering wheel having a tubular upper portion swiveled in the wheel frame, a handle for said truck pivoted upon said swiveled member, a thrust bar arranged within said tubular portion of the swivel member, a connection between said thrust bar and the handle for actuating the former downwardly through downward swinging of the latter, and a mechanism for elevating the loading frame actuable by said thrust bar including an element upon which the thrust bar bears freely and a connection between said element and said loading frame.

2. A lifting truck comprising a wheeled frame having a steering wheel, a loading frame vertically adjustable upon said wheeled frame, a mounting for the steering wheel swivelly connected to the wheeled frame, a handle pivoted upon said swivel mounting, a bell crank pivoted upon the wheeled frame, a link connecting one arm of said bell crank to the loading frame, a thrust bar resting upon the other arm of said bell crank, and means for actuating the thrust bar by the handle through swinging of the latter.

3. A lifting truck comprising a wheeled frame having a steering wheel, a loading frame vertically adjustable upon said wheeled frame, a mounting for the steering wheel vertically swivelly connected to the wheeled frame, a handle pivoted upon said mounting, a bell crank pivoted upon the wheeled frame, a link connecting one arm of the bell crank to the loading frame, a thrust bar engaging the other arm of the bell crank, a link for actuating the thrust bar from the handle, and means for detachably engaging said handle and link.

4. A lifting truck comprising a wheeled frame having a steering wheel, a loading frame vertically adjustable upon said wheeled frame, a journal member for said steering wheel swivelly connected to the wheeled frame, a handle vertically angularly adjustable upon said journal member, a bell crank pivoted upon the wheeled frame, a link connecting one arm of said bell crank to the loading frame, a thrust bar axially mounted within the swiveled portion of said journal member and loosely bearing upon the other arm of said bell crank, a handle pivoted to swing vertically upon said journal member, a link connecting said thrust bar to the pivot of said handle and a dog pivoted upon said handle detachably engageable with said link to establish an actuating connection from the handle to the thrust bar.

5. A lifting truck comprising a wheeled frame having a steering wheel, a loading frame vertically adjustable upon said wheeled frame, a mounting for the steering wheel vertically swivelly connected to the wheeled frame, a handle pivoted upon said mounting, and mechanism for raising said loading frame by means of said handle including an element extending in a substantially axial relation to said swivel mounting, a member loosely engaging said element and connected to said loading frame, a link connecting said element to said handle, said link having a shoulder, and a dog carried by said handle adjustable to or from the shoulder of said link for actuating said element.

6. A lifting truck comprising a wheeled frame, a loading frame vertically adjustable upon said wheeled frame, a handle pivotally mounted upon said wheeled frame, and mechanism for raising said loading frame by means of said handle including a lever connected to said loading frame, a bar engaging said lever, a link connected to said bar and to said handle, and means carried by the handle adapted to engage the link for actuating said bar and causing said lever to move said loading frame.

7. A lifting truck comprising a wheeled frame having a steering wheel, a loading frame vertically adjustable upon the wheeled frame, a mounting for the steering wheel swivelly connected to the wheeled frame, a handle pivotally mounted upon said swivel mounting, a bar arranged substantially at the swivel axis of said mounting, an element carried by said swivel mounting actuable by the handle and engaging the upper end of said bar to shift the said bar substantially vertically, and mechanism adapted to be moved by the bar for raising the loading frame, said mechanism including a bell crank lever engaged by the lower end of said bar, said bell crank lever being connected to said loading frame, the bar being rotatively free relative to said bell crank lever.

In testimony whereof I affix my signature.

HENRY F. MARTIN.